Sept. 23, 1969     E. C. DEVLIN ET AL     3,469,235
VEHICLE WARNING LIGHT AND SYSTEM
Filed March 3, 1967
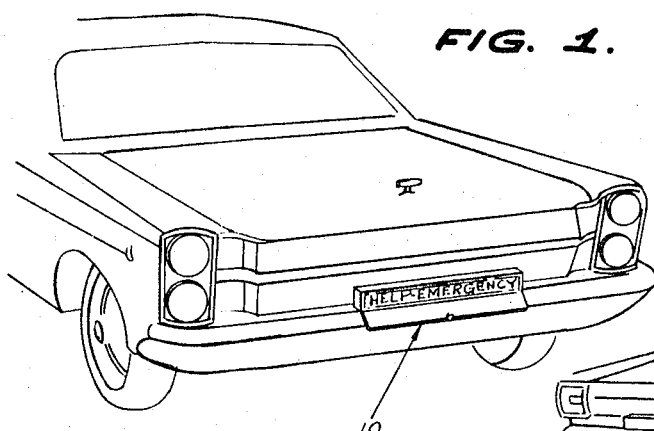
FIG. 1.
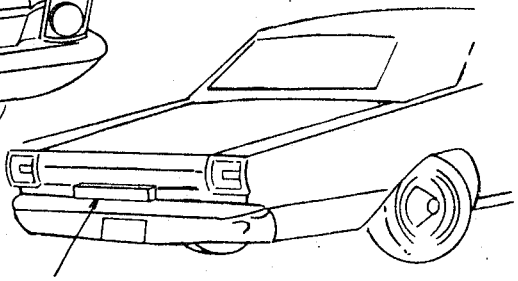
FIG. 2.
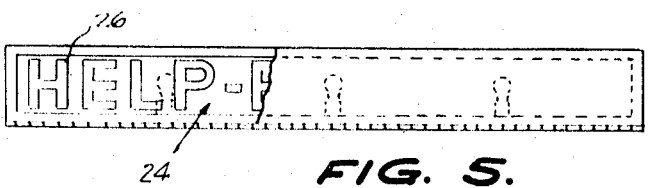
FIG. 3.
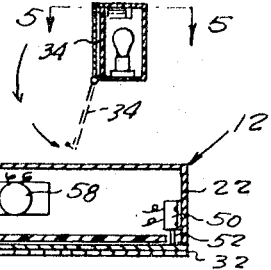
FIG. 4.
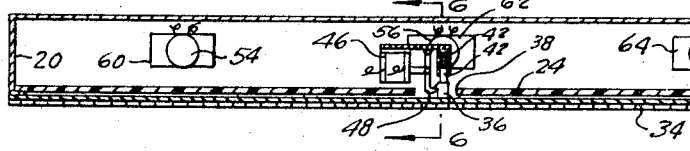
FIG. 5.
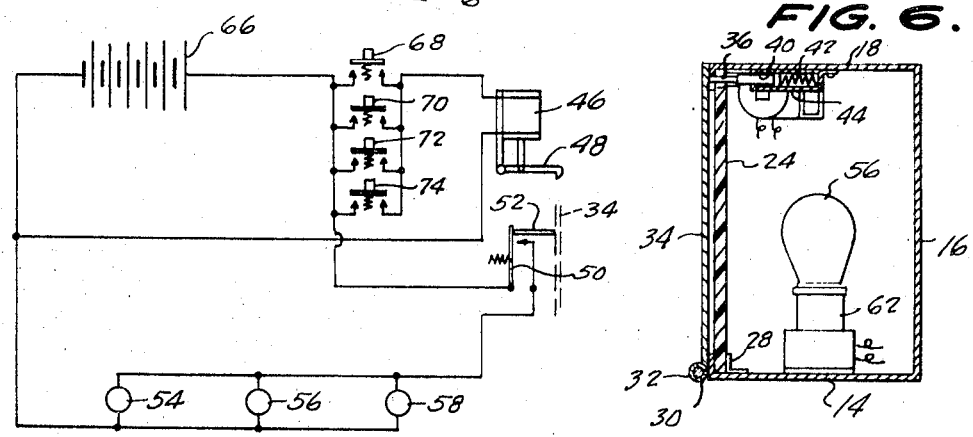
FIG. 6.
FIG. 7.
INVENTORS.
JAMES M. R. PHILLIPS,
EDWARD C. DEVLIN,
BY
Kimmel, Crowell & Weaver
ATTORNEYS.

United States Patent Office 3,469,235
Patented Sept. 23, 1969

3,469,235
VEHICLE WARNING LIGHT AND SYSTEM
Edward C. Devlin and James M. R. Phillips, both of P.O.
Box 239, Andersen, Calif. 96007
Filed Mar. 3, 1967, Ser. No. 620,465
Int. Cl. B60q 1/52
U.S. Cl. 340—107          1 Claim

ABSTRACT OF THE DISCLOSURE

A warning light system which may be actuated from either the front or rear seat of an automobile and which includes a housing, a translucent message forming cover on the housing, lamps in the housing, a movable cover for protecting the message forming cover and an electrical system including an electric latch for releasing the movable cover is disclosed.

BACKGROUND OF THE INVENTION

Field of the invention

This invention relates to communication systems and to vehicle communication systems in particular.

Description of the prior art

Numerous illuminated communication systems for vehicles are known in the prior art. It is known in the prior art, also, to provide a translucent illuminated cover which conveys words or phrases to inform persons outside the automobile of a condition of the automobile. Such systems, however, have been limited to conveying information with regard to the present condition of the automobile or to some future condition or movement of the automobile and control of such communication systems have generally been limited to the driver of the vehicle. We are not aware of any disclosure in the prior art which teaches a system which may be actuated by any occupant of the automobile to give a signal to persons outside the automobile of an emergency condition existing in the automobile with respect to one or more of the occupants.

SUMMARY

The primary object of this invention is the provision of means for the driver or a passenger or passengers in a vehicle to be able to communicate with the outside, such as passing motorists, police cars, etc., that he or she is in trouble and is in need of assistance or help.

While numerous communication systems have been provided in automobiles, no communication system has been proposed which would permit an occupant of that automobile, either in the front or rear seat area of the automobile to give a distress signal indicating the need of assistance to those outside the automobile. Situations are not unknown in which a young lady driving an automobile or in the process of parking the automobile or preparing to drive the automobile may be approached by a man who may force his way into the car with an attempt either to rob the young lady or to assault her. In addition, an emergency such as a heart attack or another sudden illness may come upon a person who is driving along in an automobile. In either case, it would be desirable for the person to communicate the emergency situation to persons outside the automobile to seek assistance. In some circumstances, it is highly desirable to permit communication of a distress condition to persons outside the automobile either by the driver or by an occupant of the rear seat. It is, therefore, an object of this invention to provide a means for permitting an occupant of either the front or the rear seat of an automobile to communicate a distress condition to persons outside the automobile. Specifically, it is an object of this invention to provide a vehicle communication system which includes front and rear distress light signals and means in the front and rear seat areas to actuate the light signal.

A particular object of the present invention is the provision of a distress light signal which may be mounted on the front and rear of the vehicle and which has a movable cover over an illuminated signal cover to prevent a false indication of distress and to prevent dust and dirt and road film from accumulating on the illuminated sign portion of the distress signal.

A novel release mechanism for a movable cover in an illuminated distress light and other specific combinations of elements and constructions also constitute important objects of the present invention.

BRIEF DESCRIPTION OF THE DRAWING

FIGURE 1 is a front view of an automobile including the emergency distress signal light system of this invention showing the front emergency signal in the open position.

FIGURE 2 is a rear view of the automobile showing the rear emergency distress signal in position.

FIGURE 3 is a front view of the emergency distress signal of this invention shown in partial cutaway.

FIGURE 4 is an end view of the signal of FIGURE 3 as shown in cross section.

FIGURE 5 is a top view shown in cross section taken substantially along lines 5—5 in the direction of the arrows of the invention showing the electrically actuated latch release mechanism for releasing the movable cover of the distress signal.

FIGURE 6 is an end view in cross section showing in enlarged scale the construction of the signal and the latch mechanism for the distress signal.

FIGURE 7 is an electrical schematic diagram of the system of this invention.

DESCRIPTION OF THE PREFERRED EMBODIMENT

As shown in FIGURES 1 and 2, it is contemplated that an emergency distress signal lamp system will include a distress signal mounted on the front of a vehicle as shown in FIGURE 1 or on the rear of a vehicle as shown in FIGURE 2. The distress signal 10 may be mounted adjacent a bumper on the front or rear of an automobile as shown in the drawings. In addition, they may be countersunk into the trunks or under or over the bumpers of new cars. On trucks, they may be mounted on the front over the bumpers or under them or on trailers horizontally or vertically countersunk into the superstructures or frame of the truck. In the case of trucks, it would be possible to omit the cover since the signs could be mounted above the road splash. In any event, it is contemplated that one signal would be mounted in the front of the vehicle and another in the rear of the vehicle. The front and rear mountings would obviously include mountings which were not, technically speaking, on the front of the vehicle but rather were exposed to communicate to the front of the vehicle.

As shown in FIGURES 3 through 6, each of the signals, in a preferred embodiment, individually comprise a housing 12 which includes a base plate 14, a rear plate 16, and a top plate 18 as well as end closures 20 and 22. In the preferred embodiment, the front of the housing which may be made of metal or Fiberglas or plastic or any other suitable material is open. This opening is covered by an at least partially translucent covering 24 having characters therein forming a message phrase shown generally at 26. As shown in FIGURE 6, this translucent covering may be held in place by a bracket 28 and by a lip 30, lip 30 also supporting a hinge 32 which movably mounts a movable cover 34 which, as shown in FIGURE 4, may move from a first position in which it covers the translucent covering to a second position in which the translucent covering is exposed.

In the preferred embodiment, the movable cover is held closed by an electric latch system. The movable cover may be provided with a latch dog 36 which extends through an opening 38 in the translucent covering 24. The latch dog 36 is resiliently biased outwardly by a slidable pin 40 and spring 42 received in a bracket 44, as shown in FIGURE 6. The movable cover 34 may be released for movement from its first position by electrical energization of solenoid 46 which retracts pivoted arm 48 to disengage dog 36. In the preferred embodiment, a switch 50 is mounted in the housing in a conventional manner with an actuating pin 52 selectively engaged by movable cover 34. Switch 50 is mounted and connected in such a manner that when cover 34 is closed and pin 52 is engaged the switch is in the open position while when cover 34 is released for movement by actuation of solenoid 46, switch 50 closes. A plurality of lamps 54, 56 and 58 may be mounted using any conventional bases such as bases 60, 62 and 64 in the housing.

With reference now particularly to FIGURE 7, circuit means including a battery 66 as a source of electrical energy is provided. A plurality of switches 68, 70, 72 and 74 electrically in parallel is located in series with the actuating solenoid 46. Thus, when any of the switches 68, 70, 72 or 74 is individually depressed momentarily solenoid 46 is actuated releasing the cover 34 for movement from its first position to its second position. Release of the individual switch 68, 70, 72 or 74 would deenergize solenoid 46, but the cover 34 would remain in its second open position.

When cover 34 moves from its first position it permits switch 50 to close, as shown in FIGURE 7, thereby energizing lamps 54, 56 and 58.

Thus, only a momentary closing of one of the switches is necessary to actuate the distress signal which will remain in the energized condition until manually closed by someone outside the vehicle. It is an important feature of the invention that at least one of the switches is located in the front seat area and at least one of the switches is located in the rear seat area. Preferably, two switches are located in the front seat area and two switches are located in the rear seat area to permit any person in either the front or rear seat to give a distress signal. It is further contemplated that the switches may be located out of ordinary view in a position known only to those familiar with the automobile. Thus, the signal could be given by one in the automobile without the knowledge of another in the automobile. As in the case of an individual being robbed or attacked in the automobile.

It will be noted that there are three lamps provided in the distress signal housing. Thus, if one lamp or even two lamps burn out a distress signal will still be given.

It is important to note that the cover 34 is provided for two purposes. First, cover 34 protects the message-bearing translucent covering 24 from dust and dirt and road film and road dirt generally. Secondly, cover 34 prevents the giving of a false indication of distress through reflected light upon the character bearing translucent covering 24.

We claim:
1. A vehicle distress light system comprising:
a housing mounted on the front and rear of a vehicle with each of said housings including an open front;
a partially translucent covering for said open front detachably secured to said housing and having characters forming a message phrase in said covering;
at least one electric lamp mounted in said housing;
a movable cover for the front of said housing adapted to overlie said translucent covering with said movable cover in closed position;
hinge means securing the lower horizontal edge of said movable cover to the lower front edge of said housing;
a latch mounted on said housing for engaging the upper portion of said movable cover to latch said movable cover in closed position;
a solenoid for retracting said latch to permit said cover to hinge to open position;
a normally closed electric switch mounted in said housing and held in open position by said movable cover when in closed position;
a plurality of hand actuated electric switches in the front and rear seat areas of said vehicle; and
circuit means including a source of electric energy, interconnecting said lamp, said normally closed switch, said solenoid and said hand operated switches whereby closing of any one of said hand operated switches energizes said solenoid to retract said latch to permit said movable cover to open permitting said normally closed switch to close to energize said lamp.

References Cited

UNITED STATES PATENTS

| | | | |
|---|---|---|---|
| 1,216,207 | 2/1917 | Burgess | 340—145 |
| 1,301,396 | 4/1919 | Dau | 340—120 |
| 1,697,804 | 1/1929 | Blackmore | 340—145 |

JOHN W. CALDWELL, Primary Examiner

MICHAEL SLOBASKY, Assistant Examiner

U.S. Cl. X.R.

240—41.61, 46.23; 340—87, 102, 103, 120, 145